US008560795B2

(12) United States Patent
Mei et al.

(10) Patent No.: US 8,560,795 B2
(45) Date of Patent: Oct. 15, 2013

(54) MEMORY ARRANGEMENT FOR MULTI-PROCESSOR SYSTEMS INCLUDING A MEMORY QUEUE

(75) Inventors: Bingfeng Mei, Hangzhou (CN); Suk Jin Kim, Younggin-si (KR); Osman Allam, Leuven (BE)

(73) Assignees: IMEC, Leuven (BE); Samsung Electronics Co., Ltd., Suwon-si, Gyeonggi-do (KR)

( * ) Notice: Subject to any disclaimer, the term of this patent is extended or adjusted under 35 U.S.C. 154(b) by 342 days.

(21) Appl. No.: 11/966,832

(22) Filed: Dec. 28, 2007

(65) Prior Publication Data
US 2008/0140980 A1 Jun. 12, 2008

Related U.S. Application Data

(63) Continuation of application No. PCT/EP2006/006375, filed on Jun. 30, 2006.

(60) Provisional application No. 60/695,506, filed on Jun. 30, 2005.

(51) Int. Cl.
G06F 12/00 (2006.01)
(52) U.S. Cl.
USPC ............... 711/167; 711/3; 711/5; 711/120; 711/127
(58) Field of Classification Search
USPC .................. 711/3, 5, 120, 127, 167
See application file for complete search history.

(56) References Cited

U.S. PATENT DOCUMENTS

| 4,386,367 | A | * | 5/1983 | Peterson et al. | 348/446 |
|---|---|---|---|---|---|
| 4,720,780 | A | * | 1/1988 | Dolecek | 712/18 |
| 5,214,769 | A | | 5/1993 | Uchida et al. | |
| 5,261,072 | A | * | 11/1993 | Siegel | 710/22 |
| 5,293,607 | A | * | 3/1994 | Brockmann et al. | 711/5 |
| 5,559,970 | A | | 9/1996 | Sharma | 710/317 |
| 5,625,831 | A | * | 4/1997 | Priest et al. | 713/500 |
| 5,790,851 | A | * | 8/1998 | Frank et al. | 718/104 |
| 5,832,304 | A | * | 11/1998 | Bauman et al. | 710/40 |
| 5,974,499 | A | * | 10/1999 | Norman et al. | 711/103 |
| 6,078,983 | A | * | 6/2000 | Hanawa et al. | 710/240 |
| 6,081,884 | A | * | 6/2000 | Miller | 712/204 |
| 6,564,304 | B1 | | 5/2003 | Van Hook et al. | |
| 7,130,308 | B2 | * | 10/2006 | Haddock et al. | 370/423 |

(Continued)

FOREIGN PATENT DOCUMENTS

| EP | 0623880 A2 | 11/1994 |
|---|---|---|
| WO | WO 02/37284 A2 | 5/2002 |
| WO | WO 03/100618 A2 | 12/2003 |

OTHER PUBLICATIONS

International Search Report for PCT/EP2006/006375 published Jan. 11, 2007.

(Continued)

Primary Examiner — Reginald Bragdon
Assistant Examiner — Gurtej Bansal
(74) Attorney, Agent, or Firm — Knobbe Martens Olson & Bear LLP

(57) ABSTRACT

A hardware memory architecture or arrangement suited for multi-processor systems or arrays is disclosed. In one aspect, the memory arrangement includes at least one memory queue between a functional unit (e.g., computation unit) and at least one memory device, which the functional unit accesses (for write and/or read access).

30 Claims, 10 Drawing Sheets

(56) References Cited

U.S. PATENT DOCUMENTS

| | | | |
|---|---|---|---|
| 7,234,030 B1* | 6/2007 | Gupta et al. | 711/154 |
| 7,277,982 B2* | 10/2007 | Calvignac et al. | 711/105 |
| 7,415,033 B2* | 8/2008 | Lampin et al. | 370/459 |
| 7,834,881 B2* | 11/2010 | Liu et al. | 345/557 |
| 2003/0188299 A1* | 10/2003 | Broughton et al. | 717/141 |
| 2003/0196058 A1 | 10/2003 | Ramagopal et al. | |
| 2003/0233532 A1* | 12/2003 | Duranton et al. | 712/214 |
| 2004/0073741 A1* | 4/2004 | Klein | 711/3 |
| 2004/0194094 A1* | 9/2004 | Qiu et al. | 718/100 |
| 2004/0205305 A1* | 10/2004 | Lee et al. | 711/149 |
| 2005/0013302 A1* | 1/2005 | Lee et al. | 370/395.7 |
| 2005/0177689 A1* | 8/2005 | Leijten | 711/149 |
| 2005/0232056 A1* | 10/2005 | Leijten-Nowak | 365/230.01 |

OTHER PUBLICATIONS

Written Opinion of the International Searching Authority for PCT/EP2006/006375 dated Jan. 11, 2007.

International Preliminary Report on Patentability for PCT/EP2006/006375 dated Aug. 30, 2007.

TI Inc., "TMS320C64x Technical Overview", Texas Instruments, Jan. 2001, Texas.

Bingfeng Mei, Serge Vernalde, Diederik Verkest, Hugo De Man, Rudy Lauwereins "Exploiting Loop-Level Parallelism on Coarse-Grained Reconfigurable Architectures Using Modulo Scheduling", IEE Proceedings Computer & Digital Techniques, vol. 150, No. 5, Sep. 2003.

Adisak Mekkittkul, Nick McKeown, "A Starvation-free Algorithm for Achieving 100% Throughput in a Input-Queued Switch", International conference on computer communications and networks (ICCCN), Washington, DC, Oct. 1996.

Bingfeng Mei, A Tightly Coupled VLIW/Reconfigurable Matrix Architecture and a Modulo Scheduling Method Suitable for the Matrix Architecture, text as filed for U.S. Appl. No. 60/614,379 on Sep. 28, 2004.

European Search Report dated Mar. 31, 2011 for European Application No. 10184465.2.

* cited by examiner

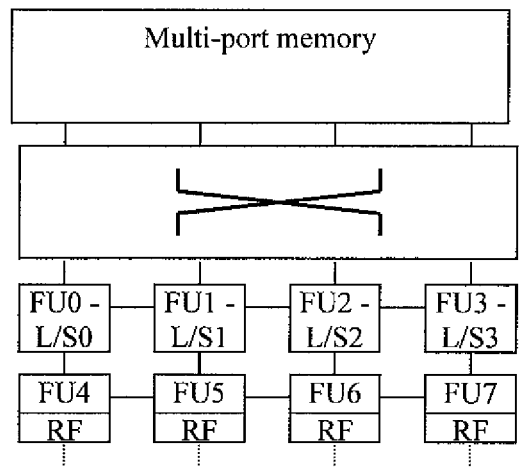
Figure 1 – PRIOR ART
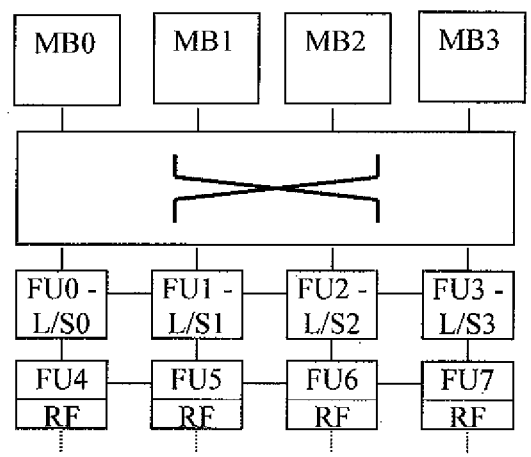
Figure 2 – PRIOR ART

|  | iter1 | iter2 | iter3 | iter4 | iter5 | iter6 | iter7 | iter8 | ave |
|---|---|---|---|---|---|---|---|---|---|
| bank0 | 4 | 0 | 4 | 0 | 4 | 0 | 4 | 0 | 2 |
| bank1 | 4 | 0 | 4 | 0 | 4 | 0 | 4 | 0 | 2 |
| bank2 | 4 | 0 | 4 | 0 | 4 | 0 | 4 | 0 | 2 |
| bank3 | 4 | 0 | 4 | 0 | 4 | 0 | 4 | 0 | 2 |
| bank4 | 0 | 4 | 0 | 4 | 0 | 4 | 0 | 4 | 2 |
| bank5 | 0 | 4 | 0 | 4 | 0 | 4 | 0 | 4 | 2 |
| bank6 | 0 | 4 | 0 | 4 | 0 | 4 | 0 | 4 | 2 |
| bank7 | 0 | 4 | 0 | 4 | 0 | 4 | 0 | 4 | 2 |

Figure 3

|  | iter1 | iter2 | iter3 | iter4 | iter5 | iter6 | iter7 | iter8 | ave |
|---|---|---|---|---|---|---|---|---|---|
| bank0 | 8 | 8 | 0 | 0 | 0 | 0 | 0 | 0 | 2 |
| bank1 | 0 | 0 | 8 | 8 | 0 | 0 | 0 | 0 | 2 |
| bank2 | 0 | 0 | 0 | 0 | 8 | 8 | 0 | 0 | 2 |
| bank3 | 0 | 0 | 0 | 0 | 0 | 0 | 8 | 8 | 2 |
| bank4 | 8 | 8 | 0 | 0 | 0 | 0 | 0 | 0 | 2 |
| bank5 | 0 | 0 | 8 | 8 | 0 | 0 | 0 | 0 | 2 |
| bank6 | 0 | 0 | 0 | 4 | 8 | 8 | 0 | 0 | 2 |
| bank7 | 0 | 0 | 0 | 4 | 0 | 0 | 8 | 8 | 2 |

Figure 4

```
for (i = 0; i < 100; i++){
  a[i+1] = b[i] + a[i];
}
```

```
for (i = 0; i < 100; i++){
  a[i] = b[i] + a[i];
}
``` a)          b)

Figure 5

```
for (n = 0; n < h * w; n+= 4){
  j = n / w;
  i = (n % w);

addr8_s = (unsigned char *)(s + j * lx2 + i);
  addr8_d = (unsigned char *)(d + j * lx2 + i);

/* unroll 4 times */
  v1 = *(addr8_s) + *(addr8_d);
  *(addr8_d) = (v1+(v1>=0?1:0))>>1;
  v2 = *(addr8_s+1) + *(addr8_d + 1);
  *(addr8_d + 1) = (v2+(v2>=0?1:0))>>1;
  v3 = *(addr8_s+2) + *(addr8_d + 2);
  *(addr8_d + 2) = (v3+(v3>=0?1:0))>>1;
  v4 = *(addr8_s+3) + *(addr8_d + 3);
  *(addr8_d + 3) = (v4+(v4>=0?1:0))>>1;
}
```

MEMORY ARRANGEMENT FOR MULTI-PROCESSOR SYSTEMS INCLUDING A MEMORY QUEUE

CROSS REFERENCE TO RELATED APPLICATIONS

This application is a continuation of International Application PCT/EP2006/006375, filed on Jun. 30, 2006, which claims priority under 35 U.S.C. §119(e) to U.S. provisional patent application 60/695,506 filed on Jun. 30, 2005. Each of the above applications is incorporated by reference in its entirety.

BACKGROUND OF THE INVENTION

1. Field of the Invention

The invention relates to memory arrangements suited for use in multi-processor systems.

2. Description of the Related Technology

Highly parallel architectures achieve high performance by parallelizing computation. The high parallelism has to be supported by high data throughput because some computation need read data from or write results to the memory. To achieve high data throughput, memory organization of such architectures has to support multiple data accesses simultaneously. Otherwise, the performance of such architecture will suffer seriously.

One way to provide high memory bandwidth is designing a true multi-port memory (FIG. 1). It can read or write N (N=Number of port) data without any constraint at each cycle. When N is bigger than 2, however, the cost of such a memory system is prohibitively high. Area, delay and power will increase non-linearly with the increased number of ports. In practice, only up to dual-port SRAM is widely used. When targeting at embedded applications, where power and cost are key design metrics, a true multi-port memory is not a viable option.

An alternative way of providing multiple data accesses is to assemble several single-port memory banks to form a pseudo multi-port system (FIG. 2). This approach is much cheaper and faster compared with the true multi-port approach. Ideally, if all the data accesses at the same cycle go to different banks, it works like a true multi-port memory and is able to provide multiple memory accesses simultaneously. Unfortunately, in reality it is likely that several memory accesses go to the same bank at the same cycle, while a memory bank can only serve one memory request at a single cycle. The system has to been stalled to wait until all the memory requests are served. This is called memory conflict and can seriously reduce the performance.

One issue associated with the multi-bank memory organization is how address space is partitioned among multiple banks. The address space can be partitioned into several big pieces among banks, or the address space can be interleaved among banks. The first method is good when there are many independent data structures. Thus each data structure can be assigned to different banks to be accessed simultaneously without conflict. The second method performs well when there are only limited data structures but high bandwidth requirement within a data structure. This is the case for many multimedia and telecommunication applications. Therefore, the interleaved multi-bank memory is more often used. For example, TI's 64x series feature a Level-1 data cache that includes 8 memory banks to provide two ports of data access [TI Inc., "TMS320C64x Technical Overview", www.ti.com, 2005]. The data ports and the memory banks are connected through an 8×2 full crossbar. By carefully arranging data layout, and statistically accessing 2 data out of 8 banks, the amount of memory conflict can be controlled at low level.

SUMMARY OF CERTAIN INVENTIVE ASPECTS

In a first aspect of the invention a hardware memory architecture or arrangement is proposed, suited for multi-processor systems or arrays such as presented in U.S. provisional 60/614,379 filed Sep. 28, 2004, the hardware memory architecture or arrangement comprising at least one memory queue.

One inventive aspect is to add between a functional unit (computation unit) and at least one memory, which the functional unit accesses (write and/or read), at least one memory queue.

One inventive aspect relates to a multi-processor system comprising at least two functional units, at least one memory device, at least one memory queue for each functional unit, wherein each memory queue is associated with a functional unit, and the at least one memory device is connected with at least two memory queues.

The multi-processor system may comprise a plurality of memory devices, wherein the number of memory queues for each functional unit is 1 or more up to and as many as there are memory devices. The multi-processor system may then furthermore comprise a switching means for selecting which memory queue output makes a memory access to which memory device.

Alternatively or on top thereof, the multi-processor system according to embodiments of the present invention may comprises a number of memory queues for each memory device which is 1 or more up to and as many as there are functional units. In this case the multi-processor system may furthermore comprise a switching means for selecting which memory queue output transfers data to which functional unit. If both foregoing embodiments are combined, the memory queues for accessing towards and from the memory devices may optionally be shared.

The above switching means may comprise at least one multiplexer. The switching means may comprise one multiplexer per memory device.

In a preferred embodiment a multiprocessor system is provided, with multiple functional units (computation units), possibly arranged in an array, and multiple memories, possibly arranged in a bank structure, wherein for at least part of the functional units as many memory queues are provided as there are memories, and each memory queue of each functional unit is dedicated for one of the memories.

In another embodiment additional re-order register files are added for at least part of the functional units. These are provided for keeping correct sequence of data coming out of the at least one memory device.

In another embodiment additional memory, such as e.g. so-called scratchpad memory is added to the multi-processor system.

In embodiments of the present invention, the number of memory devices may be smaller than four times the number of functional units.

In embodiments of the present invention, a memory device may be single ported or dual ported.

The at least one memory device may be a cache memory. The multi-processor system may then furthermore comprise SDRAM based main memory.

In embodiments of the present invention, the number of functional units may be at least eight.

In embodiments of the present invention, the number of memory queues per functional unit may equal the number of memory devices. In this case, each memory device may be associated with a memory queue of each of the functional units.

In embodiments of the present invention, the number of memory devices may not be a power of two.

In embodiments of the present invention, the multi-processor system may furthermore comprise a bypass means between a functional unit and a memory device, for bypassing the memory queues associated with the functional unit.

In embodiments of the present invention, a multi-processor system may furthermore comprise an additional storage unit, also called scoreboard, for storing a low storage cost representation of memory accesses, and control means for selecting which memory access to serve and for providing control signals to the memory device, for serving the selected memory access.

A multi-processor system according to embodiments of the present invention may furthermore comprise additional memories, and a DMA controller for data transfer between the at least one memory device and the additional memories.

In a second aspect software techniques or methods to solve the memory bandwidth problem for a multiprocessor architecture, including the proposed memory queue based architecture are shown, in particular the use of data layout.

Another inventive aspect relates to a method for determining an optimized data organization in a memory arrangement of a digital system, the memory arrangement comprising at least two memory devices, the digital system comprising at least two functional units, at least one memory queue for each functional unit, wherein each memory queue is associated with a functional unit, and each of the memory devices are connected with at least two memory queues, the digital system being configured for execution of an application. The method comprises loading a representation of the application, the representation comprising at least data access instructions, and distributing the accessed data over the memory devices such that an optimal simultaneous data accessing between the memory arrangement and the functional units is obtained.

In an embodiment wherein the data is partitioned the distributing may be performed by evaluating a optimal simultaneous data accessing cost function for various assignments of the data partitions to the memory devices. The optimal simultaneous data accessing cost may at least be determined by the number of memory conflicts.

One inventive aspect relates to a method for determining which memory access towards a memory arrangement should be served, the memory arrangement comprising at least two memory devices, the memory arrangement being of a digital system comprising at least two functional units, and at least one memory queue for each functional unit, wherein each memory queue is associated with a functional unit, and each of the memory devices are connected with at least two memory queues, the memory access being temporarily stored in the memory queues. The method comprises storing a low storage cost representation of each memory access in a storage unit or scoreboard; and performing operations on the storage unit for determining which memory access towards a memory arrangement should be served. The storage unit may have a wrapped around FIFO organization. The low storage cost representation may be a 1 bit representation.

The operations to be performed may include determining the position of at least one of the low storage cost representations of a memory access in the storage unit relatively with respect to a reference position within the storage unit, determining from the relative position how long the low storage cost representation is in the storage unit; selecting one or more of the representations which are the longest in the storage unit; and changing the reference position. When more than one representation are selected, the method may comprise performing a further selection of one representation in a random manner.

One inventive aspect relates to a method for determining information suitable for compiling an application to be executed on a system. The system is a digital system comprising at least two functional units and a memory arrangement with at least two memory devices. In the memory arrangement at least one memory queue is provided for each functional unit, wherein each memory queue is associated with a functional unit, and each of the memory devices are connected with at least two memory queues. The method comprises loading a source code representation of the application, the representation comprising at least data access instructions; and characterizing to which memory devices data accesses will be performed when executing the application. The determining information suitable for compiling an application to be executed comprises indicating that data accesses to different memory devices are free to be scheduled by the compiler at the same cycle.

In an embodiment thereof a SIMD (single-instruction-multiple-data) technique is used in combination with the data layout approach (or alternatively or in combination therewith a none power-of-2 amount of banks).

In an embodiment compiler support for exploiting the scratchpad memory is provided.

The experimental results show that most memory conflicts can be eliminated or reduced with reasonable costs by using one or more of the proposed hardware techniques alone or in combination with one or more of the proposed software (compiler) techniques.

BRIEF DESCRIPTION OF THE DRAWINGS

FIG. 1 (prior-art) shows a multi-processor system with multiple functional units (FU) (some units linked with a register file (RF)), arranged in an array, having a multi-port memory organization, linked with a crossbar and some functional units functioning as load/store functional units for the other parts of the array.

FIG. 2 (prior-art) shows a multi-processor system similar as in FIG. 1, with a multi-bank single-port memory systems.

FIG. 3 shows the bank access pattern of an Inverse Discrete Cosine Transformation (IDCT) horizontal loop.

FIG. 4 shows the bank access pattern of an IDCT vertical loop.

FIG. 5 a) Loop with through-memory cross-iteration dependency; b) loop without through-memory cross-iteration dependency.

FIG. 10 shows possible effects of the structure of FIG. 9a.

DETAILED DESCRIPTION OF CERTAIN INVENTIVE EMBODIMENTS

Figures 6, 7:
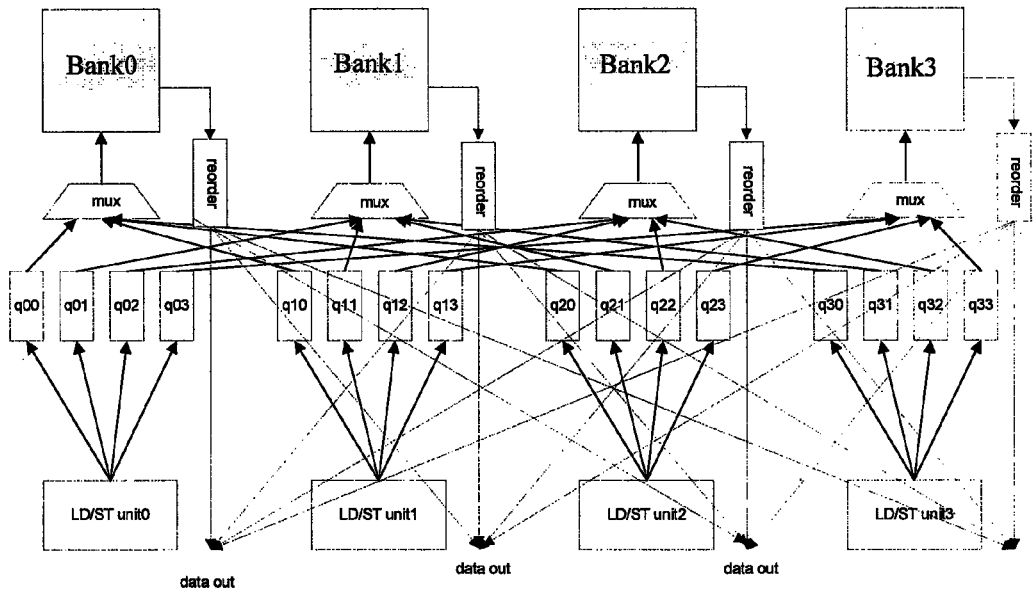
FIG. 6 illustrates motion compensation in MPEG-2.
FIG. 7 shows one embodiment of the memory architecture, comprising at least one memory queue for data transfer from a functional unit towards a memory device.

In certain embodiments of the systems considered here, the task of reducing memory conflict is more challenging because it needs to provide much more ports than a typical digital signed processor (DSP) to sustain higher level of parallelism. As an example, in an 8×8 array at least 8 memory ports are needed. If the same bank-to-port ratio as TI's 64x DSP is kept, the number of banks would be 32. The required 32×8 crossbar would be 16 times as costly and power consuming as the 8×2 crossbar found in TI's 64x DSP. Hence for certain embodiments of the systems considered here a better way is to find a more efficient solution for reducing the memory conflict, based on smaller number of banks, by applying either hardware and/or software techniques.

Basics of Interleaved Multi-Bank Memory Organization

Suppose a memory organization includes N banks. Each bank is M-byte wide. The bank number of a memory access can be calculated as following equations:

Bank number=(Address/$M$)%$N$

Address within bank=(Address/$M$)/$N$

Usually, both M and N are power of two, e.g., M=4 & N=8. Thus calculation of the bank number and the address within bank is trivial. Suppose an array short Data[8][8] is mapped to a multi-bank memory system where M=4 & N=8, the bank number of each element is shown in Table 1 assuming the first element starts from bank 0.

TABLE 1

| bank number of an 8 × 8 short array | | | | | | | | |
|---|---|---|---|---|---|---|---|---|
| | [*][0] | [*][1] | [*][2] | [*][3] | [*][4] | [*][5] | [*][6] | [*][7] |
| [0][*] | 0 | 0 | 1 | 1 | 2 | 2 | 3 | 3 |
| [1][*] | 4 | 4 | 5 | 5 | 6 | 6 | 7 | 7 |
| [2][*] | 0 | 0 | 1 | 1 | 2 | 2 | 3 | 3 |
| [3][*] | 4 | 4 | 5 | 5 | 6 | 6 | 7 | 7 |
| [4][*] | 0 | 0 | 1 | 1 | 2 | 2 | 3 | 3 |
| [5][*] | 4 | 4 | 5 | 5 | 6 | 6 | 7 | 7 |
| [6][*] | 0 | 0 | 1 | 1 | 2 | 2 | 3 | 3 |
| [7][*] | 4 | 4 | 5 | 5 | 6 | 6 | 7 | 7 |

Memory Access Characteristics in Typical Loops

In the architecture under consideration, the main computational model is software pipelining. Only loops are mapped in the array mode because of their importance and regularity. A loop is scheduled in a way that a new iteration can be initiated at a fixed interval. Execution of different iterations is overlapped to achieve high parallelism. See [Bingfeng Mei, Serge Vernalde, Diederik Verkest, Hugo De Man, Rudy Lauwereins "Exploiting Loop-Level Parallelism on Coarse-Grained Reconfigurable Architectures Using Modulo Scheduling", IEE Proceedings Computer & Digital Techniques, Vol. 150, No. 5, September 2003] hereby fully incorporated by reference.

Understanding the memory access characteristics of the typical loops is key for solving the memory bandwidth problem. There are several interesting facts we observed in typical multimedia and telecommunication applications.

First, there may be burst requests to limited memory banks at certain cycles or iterations. However, the average memory request for each memory bank is at the same level over cycles and iterations. For example, there are a horizontal loop and a vertical loop in IDCT (Inverse Discrete Cosine Transformation) function. Both the input and output data are stored at the 8×8 array shown in Table 1. During the horizontal loop, each iteration reads a row of data, does 8-point IDCT, and writes back in the same way. The vertical loop behaves similarly except reading and writing a column. Therefore, we can get the following bank access pattern (as illustrated in FIG. 3 and FIG. 4). In each iteration, the burst request to each bank is different. Especially in the vertical case, each iteration 2 out of 8 banks may receive 8 requests each, while the other banks don't have any request. If we focus on one iteration, each iteration will need at least 8 cycles due to the memory conflict. However, if we look at the average memory requests for all the iterations, each bank actually receives the same 2 requests/per iteration. Theoretically, it means that an interleaved 8-bank organization is able to sustain 2 cycles/iteration from memory point of view. It is possible by combining memory accesses in different iterations to resolve the memory bank conflict. It perfectly matches the computational model of the system under consideration, where iterations are overlapped.

Second, the cross-iteration dependence through the memory is rare in the typical multimedia and telecommunication applications. In the other word, the memory access operations are usually not in the critical path of a pipelined loop. For example, FIGS. 5a) and 5b) show two loops with and without cross-iteration dependency through memory operations. In the first loop, the latency of the memory operations is critical because the next iteration can only start after the previous iteration finishes. Suppose the memory operation takes 3 cycles, each iteration would take at least 7 cycles (3 cycles for loading a[i], 1 cycle for add, 3 cycles for storing a[i+1]). If we employ a technique that has to increase latency of K memory operations by 2 cycles, each iteration would need 7+4=11 cycles. The performance penalty is 4 cycles/per iteration. The second loop doesn't have through-memory cross-iteration dependency. The latency of the memory operations has a much smaller impact on overall performance. If the same technique of increasing memory operation by 2 cycles is used, the overall overhead is only 4 cycles over 100 iterations, or 0.04 cycle/iteration. Fortunately, most kernels in our target application belong to this type, or can be transformed to this type. Therefore, the memory queue technique presented herein can be applied.

Third, the exact bank information is sometimes unknown at design-time. It makes difficult to adopt a compiler-only approach that can schedule the memory operations to avoid memory conflict. Ideally, if the exact bank number of each memory access is known at design-time, we can schedule the memory operation in a way that no conflict will occur during run-time. Unfortunately, it is not the case for many kernels. FIG. 6 shows a piece of code in the motion compensation of an MPEG-2 decoder. All the memory operations are indicated by *( . . . ). The reference block address (pointer s in the code) is calculated from motion vector. It can start from any bank. Therefore, the bank relation between some memory accesses, e.g., *addr8_d and *addr8_s, is unknown at design-time. It is impossible to schedule the memory operations in a way to avoid the bank conflicts in any situation. Moreover, in some kernels such as FFT, although we know all the bank information at the design-time, the bank conflict relation between memory accesses changes over iterations. This also makes it difficult to adopt a compiler-only approach. This is due to the modulo scheduling technique used in the considered architecture. With this method, only one iteration is scheduled and repeated over iterations. If two memory operations are scheduled in a way that it can prevent memory conflict in one iteration, it can't guarantee that the memory conflicts won't occur in other iterations due to changing bank relationship over iterations.

The above observations provide foundation of the proposed approach described further. By making use the memory characteristics of typical loops, we propose hardware and/or software solutions, possibly in combination to reduce memory conflicts.

Memory Queue Architecture

Based on above observation, we propose an architecture, memory queue, to reduce memory conflict by taking advantages of memory access characteristics of typical loops. The basic idea of memory queue is to provide a buffer for each memory bank to smooth out the burst request over cycles and iterations. Preferably this is combined with other software transformation techniques, since it can greatly reduce memory conflicts. The overhead of this approach is increased hardware cost and increased latency of the memory operations. However, as pointed out in the last section, the increased memory operation latency only adds a small penalty to the overall performance in most kernels. Compared with reduced memory conflict, the overhead is small.

Proposed Memory Queue Architecture

The general structure of the concept of an embodiment of the present invention including a memory queue is described in FIG. 7. It contains several types of components: load/store functional units, queues, optional switching means such as a parallel-to-serial arbitrator, memory banks and optionally reorder registers.

Figure 8:
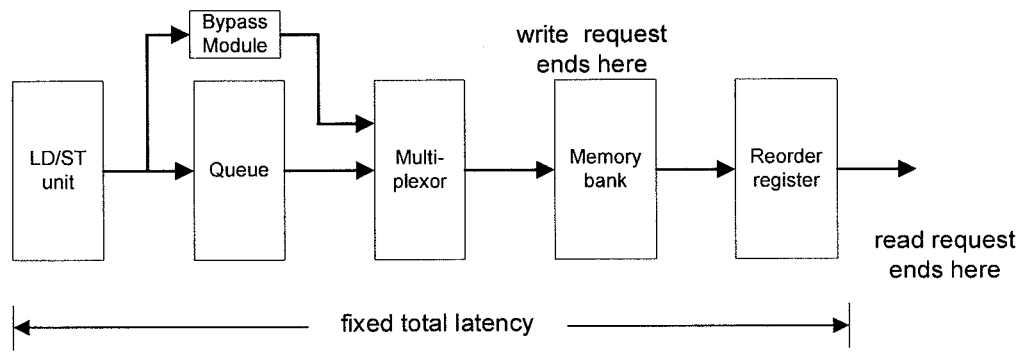
FIG. 8 presents the data flow of the invented memory queue architecture.

FIG. 8 describes the data flow of a memory request. The entire flow has a fixed total latency, e.g. 5 cycles. It means that the load/store functional unit expects the data to arrive in 5 cycles. This is the same as other processors that implement the memory operations in a pipelined way and require several cycles. A memory request first is initiated by a load/store functional unit. The request includes the target address and data (if it is a write). Then it is buffered in the queue, selected by switching means or parallel-to-serial logic and arrives at the target memory bank. It ends here if it is a write request. If it is a read request, the data that comes out from the memory bank may be buffered in the reorder registers to keep correct sequence and wait until the end of fixed latency. During this flow, a tag may be associated with the request. The tag is initialized to the fixed latency and decreased by 1 at each cycle. Basically, it provides information that reflects "urgency" of a request and whether the multiprocessor architecture needs to be stalled if a request cannot be served on time. Details of each component are discussed in following text.

Figure 9:
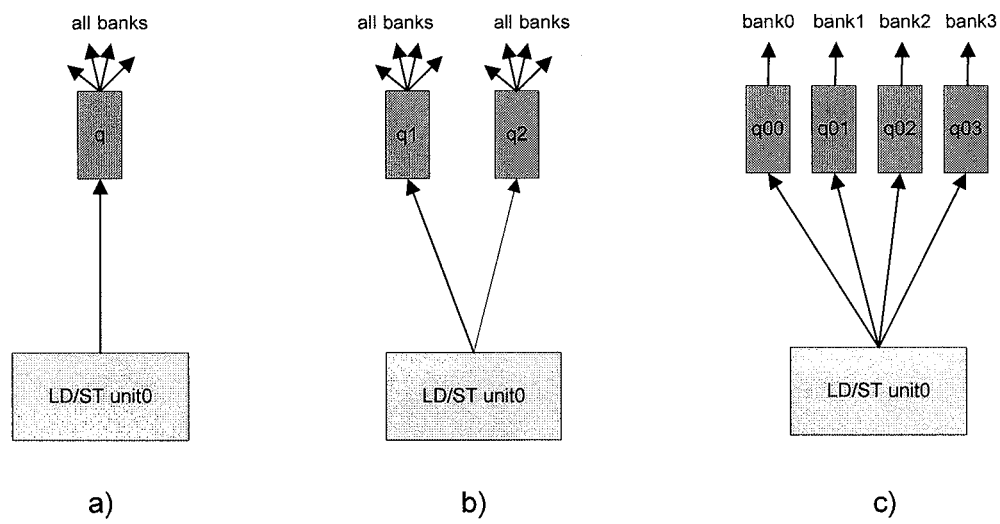
FIG. 9 illustrates three structures of a load/store functional unit and connected queues: a) one queue shared by all banks; b) multiple queues each shared by all banks; c) a dedicated queue for each bank.

The queues between load/store functional units and memory banks play a key role in buffering and smoothing memory requests. Each queue is a small FIFO (First-In-First-Out). The size of a queue can be as small as one register. There are many ways to grouping these small queues together. FIG. 9 depicts three structures of a load/store functional unit and connected queues: a) one queue shared by all banks; b) multiple queues shared by all banks; c) a dedicated queue for each bank.

Figure 10:
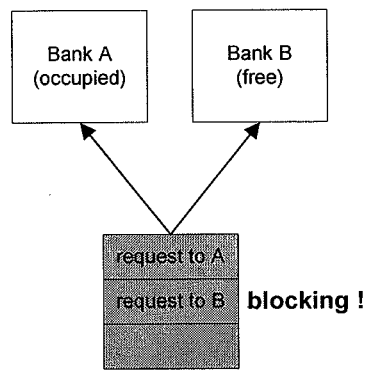

If there is only one queue for each load/store functional unit (FIG. 9a), an obvious advantage is much lower hardware cost compared to other structures. On the other hand, this simple structure is very likely to generate so-called head-of-line (HOL) blockings (FIG. 10). Supposing in one cycle the load/store functional unit issues a request to bank A, however, the bank A is occupied in serving other requests. In the next cycle, the same load/store functional unit issues another memory request to bank B. Since the previous request hasn't left the queue yet, the memory request to bank B is unnecessarily blocked even the bank B is free. A blocking doesn't necessary cause stall. However, if the blocked request is not served in time, it will cause stall eventually. Nevertheless depending on the kind of application this solution may be selected.

Figure 11:
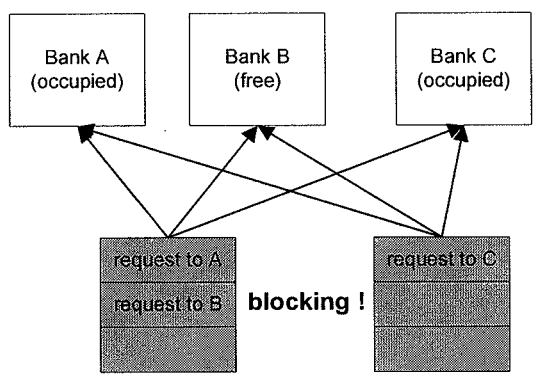
FIG. 11 shows possible effects of the structure of FIG. 9b.

One alternative way is to provide multiple queues for each load/store functional unit as shown in FIG. 9b. A memory request gets more freedom to be buffered by one of those queues regardless the target bank number. This structure should make more efficient use of the queue resources compared with dedicated queues for each bank as in FIG. 9c. On the other hand, it can reduce unnecessary stalls since a request can be buffered in an alternative queue even the previous request is blocked. Nonetheless, this approach still has several shortcomings. First, the control-logic becomes quite complicated. It has to check which queue is empty or the least occupied to send the memory request to that queue. This arbitration is not trivial and will increase delay or need an extra cycle. Second, it adds the hardware cost in the output side of the queue. Since each queue can store requests to any memory bank, to select from them needs either wider or extra level of switching means, e.g. multiplexer. It increases silicon area, delay and power consumption. Finally, it still can't fully resolve head-of-line blocking (FIG. 11). Nevertheless depending on the kind of application this solution may be selected.

To avoid above potential problems, in an embodiment of the present invention we adopt a queue organization that is analogous to the concept of virtual output queuing (VOQ) in network switching [Adisak Mekkittkul, Nick McKeown, "A Starvation-free Algorithm For Achieving 100% Throughput in a Input-Queued Switch", International conference on computer communications and networks (ICCCN), Washington, D.C., October, 1996]. Each load/store functional unit maintains a separate queue for each bank. The advantages are multifold. First, there is no head-of-line blocking as the other two structures have. A memory request is blocked only if the previous request to the same bank hasn't been served yet. In such a situation, the blocking is unavoidable. Second, the control logic is simpler compared with the structure with multiple queues. Each request can be directly buffered in the corresponding queue without making decision on which queue to pick. Third, the output side of the queue is also simpler. Each bank requires a multiplexer to multiplex queues from different banks. The multiplexer and the arbitration circuit are simpler than the multi-queue structure. The disadvantage of this approach is that it requires more registers. The total number of register can be calculated as M×N×S, where M is total number of load/store functional units, N is total number of banks and S is the queue size.

The memory queue thus controls the way a memory bank serves requests generated by several LD/ST functional units which may cause bank conflicts. Serving requests assumes a certain latency which can be configured by the system designer. Memory requests may be queued until the memory bank is ready to serve them. When a pending request waits in the queue for a long time such that it can not be served within its configured latency, the memory queue stalls the functional units. The functional units are re-activated when the memory queue foresees possibility to meet the pending requests latencies.

Figure 12:
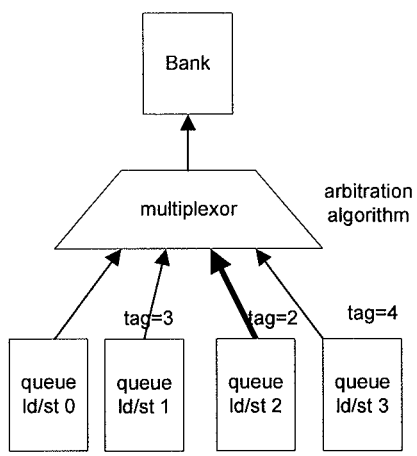
FIG. 12 shows a queue-to-bank multiplexer, used to connect the multiple queues (each linked to a functional unit (not shown)) to a bank.
Figure 13:
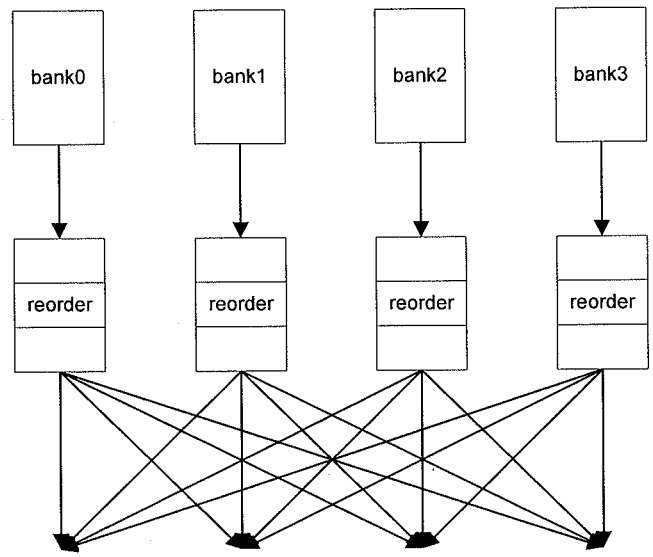
FIG. 13 shows a further embodiment of the invention wherein reorder register files are used.

There is a multiplexer between each memory bank and all the queues that buffer for this bank. Since at each cycle, a memory bank can only serve one request, some arbitration algorithm is needed if there are multiple requests waiting in the queues. An effective criterion is "urgency" of each request. As indicated before, a tag may be associated with each request. The tag is set to the predefined latency initially and decreased by 1 after each cycle. It means that the load/store functional unit expects data to arrive in the same number of cycles as the tag. Obviously, the smaller the tag, the more urgent is the request. For example, in FIG. 12 three queues contain requests with different tags. The request from load/store functional unit 2 gets picked because it is the most urgent one. Other arbitration algorithm is possible.

One embodiment also suggests an algorithm to achieve the above arbitration objective. The idea is to temporarily store a low storage cost representation of the memory requests in a storage unit, further called a scoreboard. In this context, it is enough to store one bit for each request. The location of a request in the scoreboard determines the time it has been received. A counter is used to determine how long the current request has stayed in the queue. This counter will be referred to as the Waiting Time counter (WT). These two pieces of timing information are sufficient for the memory queue to function as explained earlier.

Figure 19:
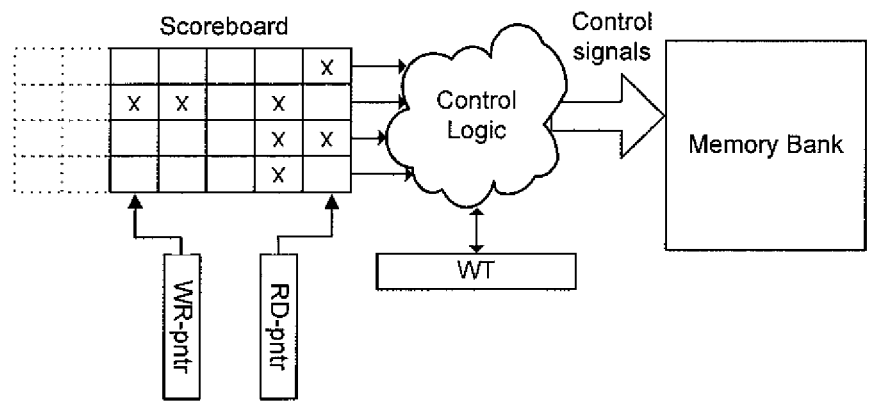
FIG. 19 is a block diagram of relevant parts of the memory queue in accordance with an embodiment of the present invention, with a scoreboard connected to four functional units.

FIG. 19 shows a block diagram of relevant parts of the memory queue with a scoreboard connected to four LD/ST functional units. A row in the scoreboard represents the timeline of requests associated with a certain LD/ST functional unit. The operation of such scoreboard can be looked at as two separate processes: a process of writing into the scoreboard and a process of reading from the scoreboard.

During a writing process, at each clock cycle, all requests from LD/ST functional units are captured in the scoreboard adding a new column, each row in that column referring to a particular LD/ST functional unit. It is to be noted that if no writing requests are made to the memory banks at a certain cycle, the new column will be blank. Additionally, when the scoreboard is empty, the writing process may decide to bypass the memory queue so that the memory bank can serve the request immediately. This writing process halts when at least one of the functional units is stalled.

During a reading process, at each clock cycle, the current column of the scoreboard is scanned for any pending requests. Requests in the same column can be served in an arbitrary order. When there are no pending requests in a given column, the memory queue moves forward to the next column and serves its requests. If the next column is empty, it moves forward to the next one and so on. When a request has been served, it is removed from the scoreboard. When all the requests of a column have been served, the entire column is removed from the scoreboard. This reading process does not halt when a functional unit is stalled.

A Waiting Time (WT) counter is provided, which basically calculates the amount of time requests have resided in the queue. It is used to stall the functional units in case requests cannot be served within the defined latency. The WT counter passes the required information to re-order the data received from the memory banks. Manipulating the WT counter depends on the status of the core (stalled/active) and the layout of pending requests in the scoreboard.

Implementation of such scoreboard takes less silicon area compared with the previous implementation with the tags, since all the tags are replaced by a single WT counter. Comparison of the tags is replaced by searching the scoreboard for pending requests, which may improve timing. This is particularly advantageous when the number of LD/ST functional units is large.

For the write transaction, i.e. a writing into a memory bank or memory device, the data flow ends when the memory request reaches the target memory bank. For the read request, i.e. reading from a memory bank, the data coming out from the memory bank is dispatched to the original load/store functional unit. One problem might arise here. Suppose two read requests a and b are initiated by a same load/store functional unit and they go to bank0 and bank1 respectively. a is initiated before b. Thus the correct order is that the data a arrives earlier than b. However, if a is blocked in the queue for several cycles because bank0 is serving requests from other load/store functional units while b is immediately served because bank1 is available, the result of b would actually arrive earlier than that of a. It means the results coming out of the memory queue are out-of-order. Moreover, since the memory latency is predefined and compilers schedule the loop according the given, pre-defined memory latency, the data has to be buffered somewhere until the end of specified latency.

A scheme to address above problems is now shown. Some reorder register files may be inserted between the memory bank and the load/store functional units in order to get correct data sequence and buffer the data until the end of the predefined latency. The number of reorder registers is equal to total_latency−overhead_cycles. The overhead cycles include the cycle that memory requests enter and leave the queues, parallel-to-serial conversion (multiplexing), real memory access, etc. Thus the reorder register file can have enough room to buffer arrived data.

Figure 14:
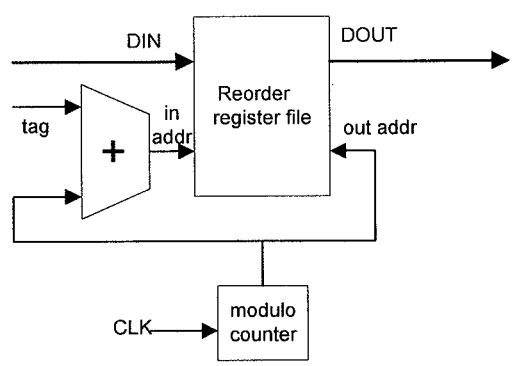
FIG. 14 presents an addressing scheme for the reorder register file.

A reorder register file is not a FIFO (first-in-first-out). It has one input port and one output port. The addressing mechanism of both ports is depicted in FIG. 14. A modulo counter is used to generate both input and output address. The counter is updated every cycle. The input port address is the sum of the tag and the counter value, whereas the output port address is only the counter value. For example, data a arrives at cycle i with a tag of 3 and data b arrives at cycle i+1 with a tag of 1. Assuming the counter value is 0 at cycle i, a is written to register 3 and b is written to register 2. In the output side, b is read out at cycle i+2, and a is read out at cycle i+3. Therefore, not only the wrong data order is corrected, but also both data come out from the memory queue architecture at the right moment.

Figures 15, 16:
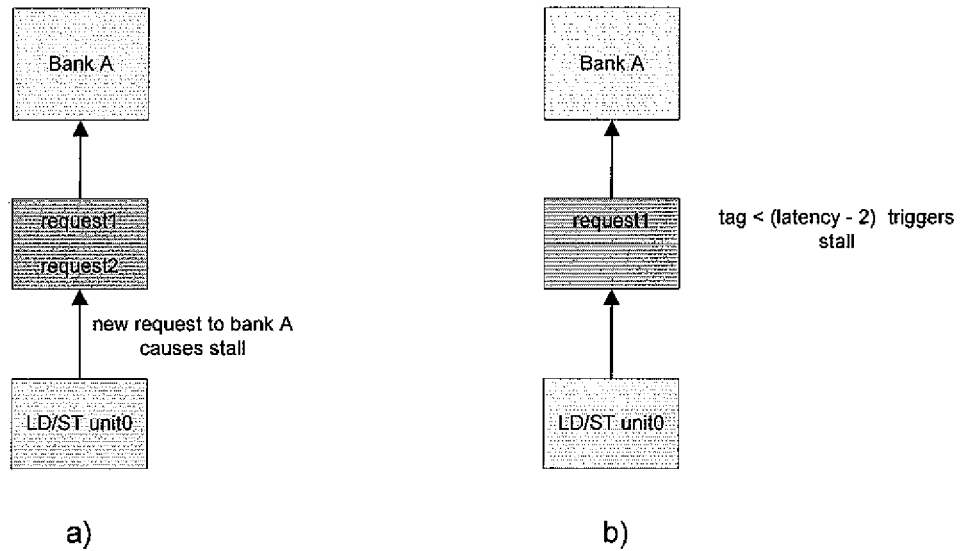
FIG. 15 indicates two stall situations: a) queue overflow stall; b) request cannot be served in time.
FIG. 16 shows the bank access pattern of the IDCT horizontal loop.

Even with the memory queue to buffer the memory requests in accordance with one embodiment, stalls may still occur in the following two situations (FIG. 15): 1) a queue is full and cannot buffer a new memory request; 2) a request waits too long in the queue so that it cannot be finished within the fixed latency. The chance of the first situation is low even with a very small queue when each load/store functional unit has a dedicated queue for each bank. A queue won't overflow unless a load/store functional unit initiates requests for the same bank repeatedly and the earlier requests are not served on time (FIG. 15*a*). For the later case, the stall can be checked in different positions, depending on implementation. For example, suppose both the memory bank and reorder registers take 1 cycle, it will trigger stall if the tag of any request in the queue head is smaller than (latency−2). It means this request cannot be served in time. Thus a stall is triggered (FIG. 15*b*).

To support the memory queue architecture, no special compilation techniques are needed. As long as the compiler supports multi-cycle memory operations, the memory queue can be handled properly.

Figure 20:
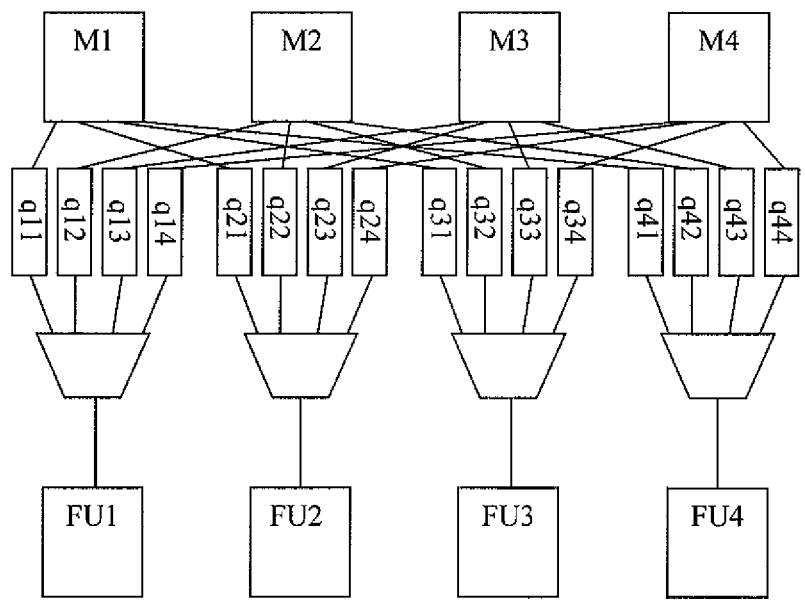
FIG. 20 is a block diagram of an embodiment of the present invention, wherein a multi-processor system comprises at least one memory queue for transfer of data from a memory device towards a functional unit.

An alternative embodiment of the present invention is disclosed in FIG. 20, where four memory devices M1, M2, M3, M4 are coupled via memory queues qij, i=1 . . . 4, j=1 . . . 4, to functional units FU1, FU2, FU3, FU4. In the embodiment illustrated, the number of memory queues for each memory device is as many as there are functional units, i.e. four. The multi-processor system furthermore comprises a switching means for selecting which memory queue output transfers data to which functional unit. In the example illustrated, the switching means comprises a plurality of multiplexers.

Figure 21:
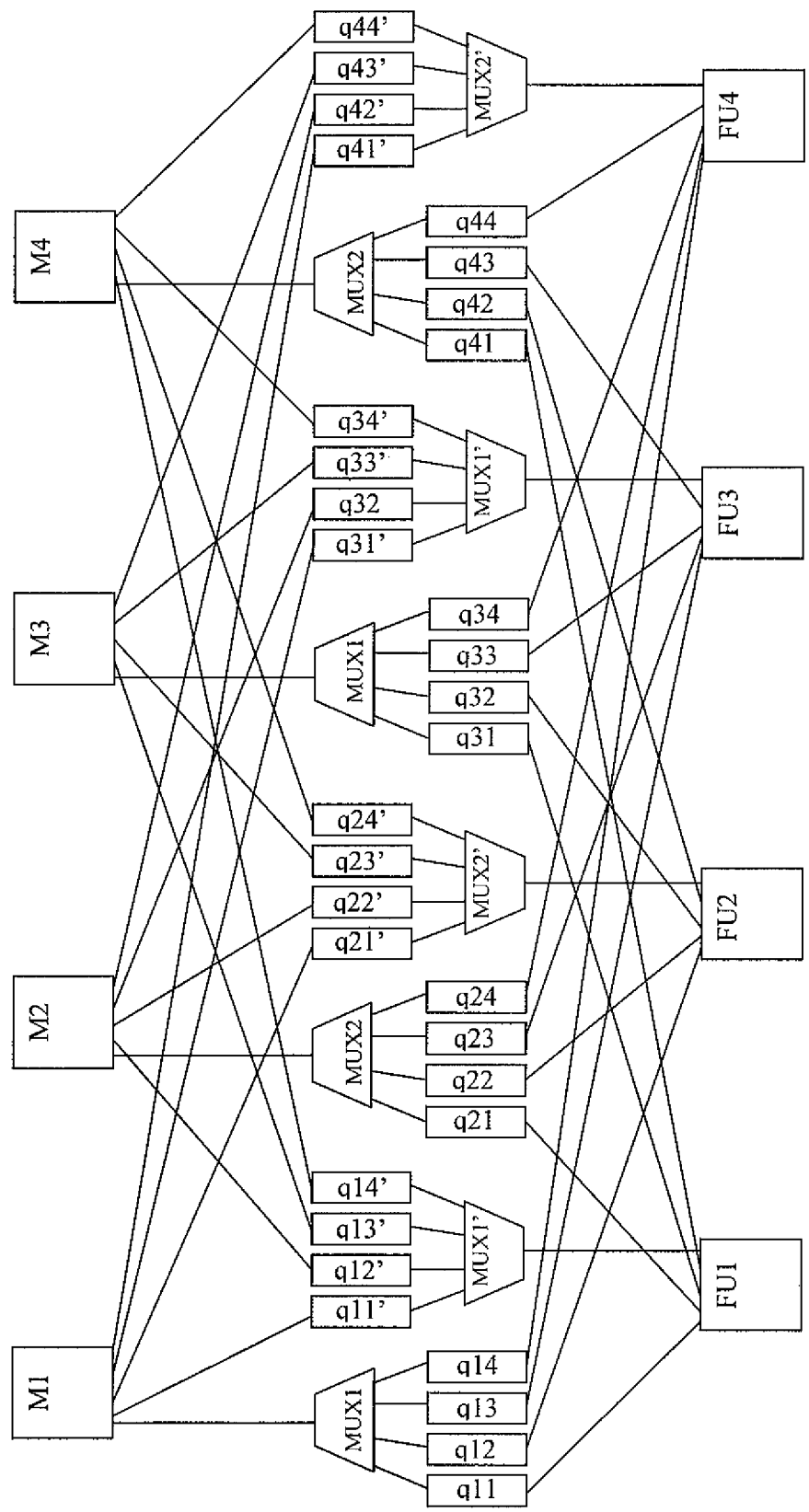
FIG. 21 is a block diagram of an embodiment of the present invention, wherein a multi-processor system comprises memory queues for transfer of data from a functional unit towards a memory device, and memory queues for transfer of data from a memory device towards a functional unit.

Yet another embodiment of the present invention is illustrated in FIG. 21, which shows four functional units FU1, FU2, FU3, FU4 and four memory devices M1, M2, M3, M4. Four memory queues qij, i=1 . . . 4, j=1 . . . 4, for each functional unit are provided, and a switching means, in the embodiment illustrated four multiplexers MUX1, MUX2, MUX3, MUX4 for selecting which memory queue output makes a memory access to which memory device. Four memory queues qij', i=1 . . . 4, j=1 . . . 4, for each memory device are also provided, and a switching means, in the embodiment illustrated four multiplexers MUX1', MUX2', MUX3', MUX4' for selecting which memory queue output transfers data to which functional unit.

In another embodiment, not illustrated in the drawings, the memory queues qij and the memory queues qij' may be shared.

Complexity Estimations of Memory Queue

In this section, we try to make a rough estimation of the hardware costs of implementing memory queues. Assumptions are as follows: number of load/store functional units=8, number of banks=8, queue size=2, memory latency=5, data width=32. This means that the queue registers comprise: 8 (load/store functional units)×8 (banks)×2 (queue size)×64 (data+address)=8192 flip-flops. The number of queue-to-bank multiplexers is: 8 (bank)×64 (data+address) 8-to-1 multiplexers=512 8-to-1 multiplexers. The reorder register file comprises: 8 (bank)×3 (register file size)×32 (data)=768 flip-flops and 8 (bank)×32 (data)=256 3-to-1 multiplexer and 1-to-3 demultiplexer Other smaller hardware costs and control logics are not counted. Though the memory queue uses considerable hardware resources, it shouldn't consume much power because of its activity level. For example, there may be 8 (load/store functional units)×8 (banks)=64 small queues. However, at most 8 (number of load/store functional units) queues are written at any moment.

Experimental Results

The experiments are based on a memory queue simulator. It is able to simulate memory queues of different latency, different number of memory banks, different queue size, etc.

Table 2 lists the experimental results of several functions. The first 4 are from an optimized MPEG-2 decoder. IDCT_add_block includes functionalities of IDCT, saturation, and adding blocks. It includes 3 kernels. Form_predications comprises 8 kernels for different cases of motion compensation. Dequantize_intra and Dequantize_non_intra are two dequantization functions for intra- and non-intra blocks. Each includes one loop. FFT_radix4 is a complex radix-4 FFT (Fast Fourier Transformation) function and includes two loops. The experiment is performed on 4096-point FFT.

The second column is the percentage of memory conflict if a simple multi-bank organization is used. In such a memory organization, the entire multiprocessor architecture has to be stalled until all the memory requests are met at each cycle. Column 3 to 5 describe the percentage of memory conflict and overhead of several different memory latencies. The memory conflict percentage is defined as following equation.

$$\text{conflict\_cycles}/(\text{total\_cycles}-\text{conflict\_cycles})$$

The overhead percentage is defined as the following equation, where the extra cycles denote the cycle difference between using and not using the memory queue assuming the latency of a normal memory operation is 3 cycles.

$$\text{extra\_cycles}/(\text{total\_cycles}-\text{conflict\_cycles})$$

It can be seen that the memory queue can greatly reduce the memory conflicts in comparisons with the simple multi-bank organization. Even with a latency of 5 cycles, the memory conflict is reduced by 50% to 75%. Increasing the queue size can reduce the memory conflicts in further, however, with increased performance overhead and hardware costs as well. In some kernels the overhead becomes quite important. The main reason is that the number of iterations in these loops is quite limited. Thus the increased memory latency can't be hidden very well.

TABLE 2

Memory conflicts for kernels (bank = 8)

|  | Simple multi-bank | Memory queue (latency = 5) | | Memory queue (latency = 6) | | Memory queue (latency = 7) | |
| --- | --- | --- | --- | --- | --- | --- | --- |
|  |  | Conflict | Overhead | Conflict | Overhead | Conflict | Overhead |
| IDCT_add_block | 82.5% | 22.1% | 0.8% | 14.3% | 1.1% | 7.4% | 1.5% |
| Form_predications | 98% | 24.7% | 2.8% | 16.8% | 4.2% | 11.4% | 5.6% |

TABLE 2-continued

| | Memory conflicts for kernels (bank = 8) | | | | | |
|---|---|---|---|---|---|---|
| | Simple multi-bank | Memory queue (latency = 5) | | Memory queue (latency = 6) | | Memory queue (latency = 7) | |
| | | Conflict | Overhead | Conflict | Overhead | Conflict | Overhead |
| Dequantize_intra | 78.1% | 36.9% | 5.5% | 29.7% | 8.33% | 18.9% | 11% |
| Dequantize_non_intra | 44.1% | 21.7% | 4% | 16.6% | 6.1% | 10.8% | 8.1% |
| FFT_radix4 | 279% | 86.1% | 0.1% | 70.5% | 0.1% | 42.9% | 0.1% |

Changing Data Layout to Reduce Memory Conflict

Although the memory queue can smooth out bank requests over different cycles and iterations and can significantly reduce memory conflicts, it is still preferred that the memory requests for different banks are evenly distributed in the first place. If the burst memory request to a certain bank is too high, we need longer queues to buffer the requests. It not only increases performance overhead, but also requires more silicon area and power consumption.

For many kernels, the bank distribution of the memory requests can be changed by optimizing data layout. The main method we applied is shifting the bank access pattern over each iteration. For example, in IDCT function, we can allocate an 8×9 array instead of an 8×8 one, however, the extra column of elements won't be used in the computation. The extra column nicely changes the bank distribution of the array as shown in Table 3.

TABLE 3

Bank number for an 8 × 9 short array

| | [*][0] | [*][1] | [*][2] | [*][3] | [*][4] | [*][5] | [*][6] | [*][7] | [*][8] |
|---|---|---|---|---|---|---|---|---|---|
| [0][*] | 0 | 0 | 1 | 1 | 2 | 2 | 3 | 3 | 4 |
| [1][*] | 4 | 5 | 5 | 6 | 6 | 7 | 7 | 0 | 0 |
| [2][*] | 1 | 1 | 2 | 2 | 3 | 3 | 4 | 4 | 5 |
| [3][*] | 5 | 6 | 6 | 7 | 7 | 0 | 0 | 1 | 1 |
| [4][*] | 2 | 2 | 3 | 3 | 4 | 4 | 5 | 5 | 6 |
| [5][*] | 6 | 7 | 7 | 0 | 0 | 1 | 1 | 2 | 2 |
| [6][*] | 3 | 3 | 4 | 4 | 5 | 5 | 6 | 6 | 7 |
| [7][*] | 7 | 0 | 0 | 1 | 1 | 2 | 2 | 3 | 3 |

Figures 17, 18:
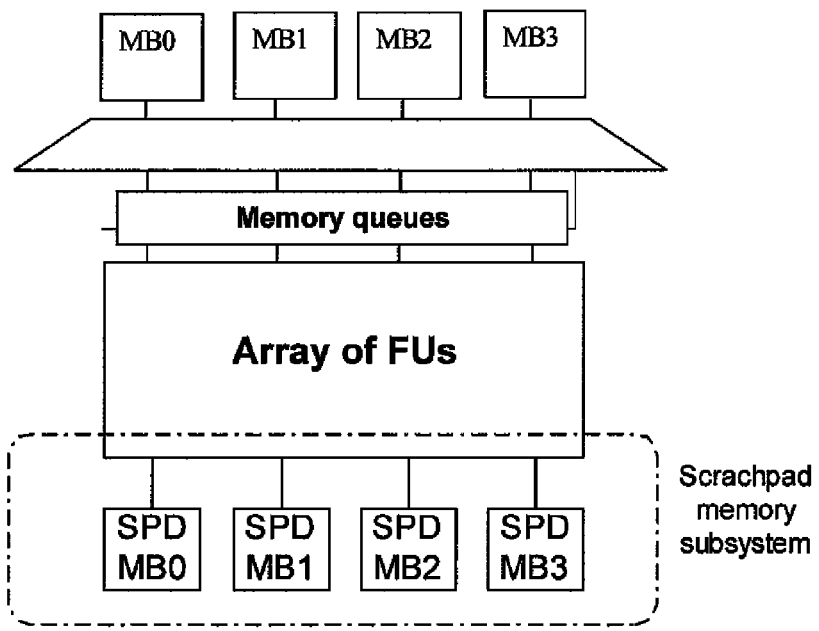
FIG. 17 shows the bank access pattern of the IDCT vertical loop.
FIG. 18 presents a further embodiment wherein a scratchpad memory subsystem is added to increase memory bandwidth.

FIGS. 16 and 17 shows the bank distribution of all the iterations in both horizontal and vertical loops. It can be seen that especially requests to each bank in the vertical loop is nicely smoothed as opposed to FIG. 4. Most banks get only 2 requests each iteration. Thus it can be easily handled by even a small memory queue.

Table 4 lists the experimental results after the data layout optimization is applied to several benchmarks. For IDCT_add_block and Form_predications, the techniques are essentially the same. 2D arrays are allocated with one extra column. Therefore, the bank number used in each iteration is shifted so that burst request over different banks are more evenly distributed. The optimization applied to two dequantization functions is simple. Some variables of 16-bit type are replaced with 32-bit type in order to be distributed to different banks. For the IDCT_add_block, almost all the memory conflicts are eliminated just by this simple transformation. For other benchmarks, the conflicts are also significantly reduced compared with hardware-only technique. Hence the use of a systematic approach for data layout optimization in combination with the proposed architecture shows excellent results.

Data layout optimization can be performed manually but this requires experience of the designer and his understanding of the application to transform the data. Alternatively a more systematic approach is implemented in a tool. Another approach is not to automate this step but to provide tools which help the designer to gain insight of the bank information and to give some suggestions on how to change data layout.

TABLE 4

| Memory conflicts after data layout (bank = 8) | | | | |
|---|---|---|---|---|
| | Simple multi-bank | Memory queue (latency = 5) | Memory queue (latency = 6) | Memory queue (latency = 7) |
| IDCT_add_block | 33% | 0.5% | 0.1% | 0% |
| Form_predications | 86.1% | 22.4% | 15.1% | 10.6% |
| Dequantize_intra | 103% | 16.1% | 4.7% | 1.1% |
| Dequantize_non_intra | 58.5% | 9.7% | 2.3% | 0.6% |

Using SIMD to Reduce Memory Bandwidth Requirement and Memory Conflict

Each memory bank is typically 32-bit wide to accommodate most cases. However, many kernels operate on data types of 8-bit or 16-bit, and many of those data accesses take place on consecutive addresses. This not only results in inefficient use of precious memory bandwidth, but also causes unnecessary memory bank conflicts. For example, considering two memory reads, A[2*i] and A[2*i+1], in a loop, these two accesses may go to the same bank. This not only requires two memory devices to execute them but also causes a stall cycle in a simple multi-bank system if they are scheduled at the same cycle. Though this situation can be handled by the memory queue, it might still cause stall if too many such cases appear in a loop. For example, the kernels in Form_predications contain many consecutive 8-bit accesses. It is possible that 4 accesses to input block, 4 accesses to reference block and 4 accesses to output block all go to the same bank (FIG. 6). Therefore, even with a long memory queue, it still can't completely eliminate memory conflicts because of too many same-bank accesses in one iteration. This situation cannot be alleviated by the data layout transformation described earlier.

To solve this problem, we may apply SIMD (single-instruction-multiple-data) technique that is widely used in other processors (Inter x86, TI DSP, etc.). Generally, SIMD is a technique wherein one instruction operates on several short data items in parallel. In one embodiment, we only apply SIMD to the data access part. The basic idea is to combine several small consecutive data items into a big one. It is read and written by one instruction. After a big data item is read, it is split into the original small data items, either by usual shift/and operations or by dedicated mvh/mvl operations. Similarly, the smaller data items are first merged before being written to the memory as a big data item. This way not only makes more efficient use of memory bandwidth, but also reduces the possibility of memory conflict.

Table 5 lists the memory conflicts of memory queues in comparisons with simple multi-bank solutions. Only Form_predications and FFT_radix4 are applied with the SIMD transformations. In Form_predications, 4 byte accesses are combined into one 32-bit access for the input and output block. However, the accesses to the reference block cannot be combined because they may or may not align to the 32-bit boundary. In FFT_radix4, two 16-bit data (two parts of a complex number) are combined into one 32-bit access. Two dequantization loops don't have any opportunity for combining memory accesses. The IDCT_add_block already has very low memory conflict, thus the SIMD transformation is not applied.

TABLE 5

Memory conflicts after SIMD

|  | Simple multi-bank | Memory queue (latency = 5) | Memory queue (latency = 6) | Memory queue (latency = 7) |
|---|---|---|---|---|
| Form_predications | 51.7% | 8.5% | 4.1% | 2.0% |
| FFT_radix4 | 197% | 43.3% | 29.5% | 16.3% |

After the SIMD transformation, memory conflicts are significantly reduced compared with the versions without transformation.

None Power-of-2 Amount of Banks

None power-of-2 amount of banks can generate better results for certain kernels. In practice, its impact is very similar to the data layout optimization as described previously. Since many algorithms of the multimedia and telecommunication applications have data sets as well as access patterns that are multiples of power-of-2, e.g., 8×8 IDCT, 1024-point FFT. By using none power-of-2 amount of memory banks, the memory requests to different banks are distributed more evenly. Therefore, we can expect less memory conflicts even with a shorter memory queue. The following experiments are done on the benchmarks without data layout and SIMD transformation except FFT_radix4.

TABLE 6

Memory conflicts for none power-of-2 banks

|  | Memory latency | 6 banks | 7 banks | 8 banks | 9 banks |
|---|---|---|---|---|---|
| IDCT_add_block | 5 | 37.8% | 4.7% | 22.1% | 33.2% |
|  | 6 | 34.1% | 0.2% | 14.3% | 29.9% |
|  | 7 | 32.6% | 0% | 7.4% | 28.1% |
| Form_predications | 5 | 33% | 23.8% | 24.7% | 25.9% |
|  | 6 | 25.1% | 15% | 16.8% | 20% |
|  | 7 | 21.2% | 8.9% | 11.4% | 16.7% |
| Dequantize_intra | 5 | 17.5% | 9.8% | 36.9% | 5.4% |
|  | 6 | 11.3% | 5.1% | 29.7% | 2.3% |
|  | 7 | 7.0% | 2.0% | 18.9% | 0.7% |
| Dequantize_non_intra | 5 | 7.6% | 5.6% | 21.7% | 2.9% |
|  | 6 | 3.6% | 3.0% | 16.6% | 1.3% |
|  | 7 | 2.0% | 1.3% | 10.8% | 0.5% |
| FFT_radix4 (simd version) | 5 | 12.2% | 9.4% | 43.3% | 5.3% |
|  | 6 | 0% | 1.7% | 29.5% | 0.5% |
|  | 7 | 0% | 0% | 16.3% | 0% |

The results are mixed. Some none-power-of-2 values are better than the 8-bank solution. For example, all the none-power-of-2 values are much better than 8 banks. However, some none-power-of-2 values are even worse than the 8-bank solution, e.g. the 6-bank and 9-bank for IDCT_add_block. It is difficult to find a universal number of banks for different kernels and different applications. It makes the architectural choice difficult for a reconfigurable architecture, which is intended for executing different applications. Secondly, if the number of banks is the power-of-2, calculation of the bank number and the address within a bank is trivial. If the number of banks is not power-of-2, it requires extra circuits to do modulo and division computation. Furthermore, modulo computation still takes at least one extra cycle, which will increase the performance overhead on top of the memory queue.

Experimental Results for a Complete Application

To understand the impact of memory conflicts for a complete application, we did some simulation on an MPEG-2 decoder. Table 7 lists the results. It is assumed that for the VLIW code the simple multi-bank organization is used because the longer latency imposes a much higher overhead in scalar code so that the reduced memory conflict cannot compensate incurred performance penalty. Additionally, there are not as many memory accesses/per cycle as the array part. Therefore, a simple multi-bank organization works quite well by statistically avoiding memory conflicts.

TABLE 7

Overall memory conflicts for MPEG-2 decoder

|  | Simple multi-bank Conflicts | Memory queue (latency = 5) | | | Memory queue (latency = 6) | | |
|---|---|---|---|---|---|---|---|
|  |  | Conflicts (array only) | Queue overhead | Total | Conflicts (array only) | Queue overhead | Total |
| No data layout optimization | 27% | 9.5% (7.1%) | 0.7% | 10.4% | 7.3% (4.9%) | 1.4% | 8.7% |
| With data layout optimization | 22% | 6.1% (3.7%) | 0.7% | 6.8% | 4.7% (2.2%) | 1.4% | 6.1% |
| With SIMD optimization | 17.4% | 4.3% (1.9%) | 0.7% | 5% | 3.1% (0.7%) | 1.4% | 4.5% |

From the results, we may think that overall conflict is not that significant even when using a simple multi-bank organization. This is because less than half of the time is spent on the array mode in the mapped MPEG-2 decoder. Therefore, the high memory conflict in the array mode doesn't appear to be that critical in the overall performance. However, if the application is more kernel-dominated like FFT_radix4, memory conflicts have a much bigger impact on the overall performance.

Adding Scratchpad Memory to Increase Memory Bandwidth

In many cases, adding scratchpad memory is a cheap way to increase the memory bandwidth. For example, in IDCT, a small buffer can store temporary data between horizontal loop and vertical loop so that the memory bandwidth is doubled. Similarly, in motion compensation and deblocking filter of H.264/AVC decoder, small buffers can be used to store temporary data as well.

Unlike the main memory hierarchy, which features switching means and memory queues to support generic situations, the scratchpad memory can be much simpler without the switching means and memory queue. However, it should also be multi-banked and interleaved to provide high bandwidth within a data array. Such a scratchpad memory sub-system not only provides higher memory bandwidth demanded by target applications, but also lowers power since smaller scratchpad memory generally consumes less energy/per access compared with the main memory hierarchy.

Architecturally, it is not difficult to add these scratchpad memories. The key issue is to have compiler support. In a first embodiment thereof the compiler provides interfaces that allow a designer to manually exploit the mapping over different memory sub-systems. In a second embodiment, the compiler can automatically exploit the usage of these scratchpad memories.

Additional Embodiments

Although the memory queue can greatly reduce bank conflicts, there is still much room to improve. Either we can reduce memory conflicts with the same memory queue size, or reduce memory queue size to achieve a same amount of memory conflicts if the compiler can take advantage of known information at design-time. For example, two 32-bit memory accesses A[i] and A[i+8] always go to the same bank in a 8-bank memory system. On the contrary A[i] and A[i+1] always occur on different banks, therefore, they are free to be scheduled at the same cycle. If the compiler can make full use of this information, many unnecessary bufferings and potential stalls can be avoided, and the queue resources can be used more efficiently. The compiler therefore must be assisted with a precompiler for analyzing the source code to obtain the information and to represent the information and thereafter pass it to the compiler, and the compiler must be adapted to incorporate these constraints into the scheduler.

As pointed out above, adding scratchpad memory is a cheap way to increase memory bandwidth and reduce power consumption. However, the compiler must support the scratchpad memory approach. If no crossbar is used in the scratchpad memory subsystem, accurate data analysis and transformation techniques are essential to ensure that each FU only accesses the attached memory bank. In practice, it is possible to use intrinsic functions to manually specify the memory access to a specific scratchpad memory system. Intrinsic function is already implemented in the present compiler to support SIMD access and other specialized instructions.

It should be noted that we only discussed the organization of level-1 memory here. The level-1 memory can be hardware-based cache or software-controlled cache. It is possible to have more levels in the memory hierarchy. Usually, there should be an SDRAM-based main memory. The data transfer between level-1 memory and other levels are typically performed through a DMA controller.

The foregoing description details certain embodiments of the invention. It will be appreciated, however, that no matter how detailed the foregoing appears in text, the invention may be practiced in many ways. It should be noted that the use of particular terminology when describing certain features or aspects of the invention should not be taken to imply that the terminology is being re-defined herein to be restricted to including any specific characteristics of the features or aspects of the invention with which that terminology is associated.

While the above detailed description has shown, described, and pointed out novel features of the invention as applied to various embodiments, it will be understood that various omissions, substitutions, and changes in the form and details of the device or process illustrated may be made by those skilled in the technology without departing from the spirit of the invention. The scope of the invention is indicated by the appended claims rather than by the foregoing description. All changes which come within the meaning and range of equivalency of the claims are to be embraced within their scope.

What is claimed:

1. A multi-processor system comprising:
a plurality of functional units;
a plurality of memory devices;
a plurality of memory queues for each functional unit, each memory queue being adapted for buffering a plurality of requests for access to an associated one of the memory devices, each request being associated with a tag set to a latency indicating urgency of the request, wherein for each request at the head of a memory queue access is permitted to the associated one memory device independent in time of each request at the head of other memory queues associated with other memory devices; and
a multiplexer for each memory device,
wherein each memory queue is associated with a specific one of the functional units, and each memory device being associated with a plurality of memory queues, wherein each memory queue is configured to stall the functional unit when a buffered request waits in the queue for a time such that it cannot be served within the latency of the tag, wherein the functional unit is stalled according to the urgency of the request indicated by the tag, wherein the multiplexer has multiple input ports each directly connected to one of the memory queues associated with its specific functional unit and a single output port connected to its associated memory device.

2. The multi-processor system according to claim 1, wherein the number of memory queues for each functional unit is one or more up to the number of memory devices, and wherein the multiplexer is configured to select which memory queue output makes a memory access to which memory device.

3. The multi-processor system according to claim 1, wherein the number of memory queues for each memory device is one or more up to the number of functional units.

4. The multi-processor system according to claim 1, wherein the number of memory devices is smaller than four times the number of functional units.

5. The multi-processor system according to claim 1, wherein each memory device is single ported or dual ported.

6. The multi-processor system according to claim 1, wherein the number of functional units is at least eight.

7. The multi-processor system according to claim 1, wherein the number of memory devices is not a power of two.

8. The multi-processor system according to claim 1, further comprising a bypass module between a functional unit and a memory device configured to bypass the memory queues associated with the functional unit.

9. The multi-processor system according to claim 1, further comprising reorder register files configured to keep a correct sequence of data coming out of the at least one memory device.

10. The multi-processor system according to claim 1, further comprising an additional storage unit configured to store a low storage cost representation of memory accesses, and a control module configured to select which memory access to serve and to provide control signals to the selected memory device, to serve the selected memory access.

11. The multi-processor system according to claim 1, further comprising additional memories, and a DMA controller configured to control data transfer between the memory devices and the additional memories.

12. The multiprocessor system according to claim 1, wherein each memory queue is further adapted to re-activate the stalled functional unit when the memory queue foresees possibility to meet the pre-determined latency for the buffered request.

13. The multi-processor system according to claim 1, wherein a tag is associated with each request and wherein the stalling is performed based on the tag.

14. The multi-processor system according to claim 1, wherein each memory queue is configured to re-activate the stalled functional unit when a possibility to meet the latency of the tag is foreseen.

15. The multi-processor system according to claim 1, wherein the number of memory queues per functional unit equals the number of memory devices.

16. The multi-processor system according to claim 15, wherein each memory device is associated with a memory queue of each of the functional units.

17. The multi-processor system according to claim 1, wherein each memory device is a cache memory.

18. The multi-processor system according to claim 17, further comprising synchronous dynamic random access memory (SDRAM) based main memory.

19. A system for processing data under control of a program, the system comprising:
a plurality of storage units;
at least one execution unit configured to execute the program, the execution unit comprising a plurality of functional units;
a plurality of memory queues for each functional unit, each memory queue being associated with a specific one of the functional units and a specific one of the storage units, each memory queue containing a plurality of requests to access the storage unit and each head of queue request being permitted access to its associated storage unit independent in time of each request at the head of other memory queues associated with other storage units; and
a multiplexer for each storage unit,
wherein each storage unit is connected with a plurality of memory queues, and wherein the functional units are connected to the storage units via the memory queues to execute the program, wherein the multiplexer has multiple input ports each directly connected to one of the memory queues associated with its specific one functional unit and a single output port connected to its associated storage unit.

20. The system according to claim 19, wherein each functional unit is connected to at least one of the memory queues via a dedicated link.

21. The system according to claim 19, wherein each memory queue is associated with a single memory device.

22. The system according to claim 19, wherein the functional units are not directly connected to the storage unit.

23. A method of determining an optimized data organization in a memory arrangement comprising at least two memory devices, of a digital system, the digital system comprising at least two functional units, a plurality of memory queues for each functional unit, and a multiplexer for each memory device, each memory queue being adapted for buffering a plurality of requests for access to an associated one of the memory devices, each request being associated with a tag set to a latency indicating urgency of the request, wherein each memory queue is associated with a specific functional unit, and each memory device is associated with at least two memory queues, wherein for each request at the head of a memory queue access is permitted to the associated one memory device independent in time of each request at the head of other memory queues associated with other memory devices, wherein each memory queue is configured to stall the functional unit when a buffered request waits in the queue for a time such that it cannot be served within the latency of the tag, wherein the functional unit is stalled according to the urgency of the request indicated by the tag, wherein the multiplexer has multiple input ports each directly connected to one of the memory queues associated with its specific functional unit and a single output port connected to its associated memory device, the digital system being configured for execution of an application, the method comprising:
loading a representation of the application, the representation comprising at least data access instructions; and
distributing the accessed data over the memory devices such that data is optimally simultaneously accessed between the memory arrangement and the functional units.

24. The method of claim 23, wherein the data is partitioned and the distributing is performed by evaluating an optimal simultaneous data accessing cost function for various assignments of the data partitions to the memory devices.

25. The method of claim 24, wherein the optimal simultaneous data accessing cost is at least determined by the number of memory conflicts.

26. A method of serving a plurality of memory accesses towards a memory arrangement, the memory arrangement comprising at least two memory devices, the memory arrangement being of a digital system comprising at least two functional units, and a plurality of memory queues for each functional unit, and a multiplexer for each memory device, each memory queue being adapted for buffering a plurality of requests for access to an associated one of the memory devices, each request being associated with a tag set to a latency indicating urgency of the request, wherein each memory queue is associated with a specific functional unit, and each of the memory devices is associated with at least two memory queues, wherein for each request at the head of a memory queue access is permitted to the associated one memory device independent in time of each request at the head of other memory queues associated with other memory devices, wherein each memory queue is configured to stall the functional unit when a buffered request waits in the queue for a time such that it cannot be served within the latency of the tag, wherein the functional unit is stalled according to the urgency of the request indicated by the tag, wherein the multiplexer has multiple input ports each directly connected to one of the memory queues associated with its specific functional unit and a single output port connected to its associated memory device, the memory access being temporarily stored in the memory queues, comprising:

storing a low storage cost representation of each memory access in a storage unit; and performing operations on the storage unit for determining one of the memory accesses towards a memory arrangement to be served.

27. The method of claim 26, wherein the storage unit has a wrapped around FIFO organization.

28. The method of claim 26, wherein the low storage cost representation is 1 bit.

29. The method of claim 26, wherein the operations comprise:

determining the position of at least one of the low storage cost representations of a memory access in the storage unit relatively with respect to a reference position within the storage unit, determining from the relative position how long the low storage cost representation is in the storage unit;

selecting one or more of the representations which are the longest in the storage unit; and changing the reference position, wherein when more than one representation are selected, performing a further selection of one representation in a random manner.

30. A method of determining information suitable for compiling an application to be executed on a system, comprising a memory arrangement comprising a plurality of memory devices, the memory arrangement being of a digital system comprising a plurality of functional units, a plurality of memory queues for each functional unit, and a multiplexer for each memory device, each memory queue being adapted for buffering a plurality of requests for access to an associated one of the memory devices, each request being associated with a tag set to a latency indicating urgency of the request, wherein each memory queue is associated with a specific functional unit, and each of the memory devices is associated with a plurality of memory queues, wherein for each request at the head of a memory queue access is permitted to the associated one memory device independent in time of each request at the head of other memory queues associated with other memory devices, wherein each memory queue is configured to stall the functional unit when a buffered request waits in the queue for a time such that it cannot be served within the latency of the tag, wherein the functional unit is stalled according to the urgency of the request indicated by the tag, wherein the multiplexer has multiple input ports each directly connected to one of the memory queues associated with its specific functional unit and a single output port connected to its associated memory device, the method comprising:

loading a source code representation of the application, the representation comprising at least data access instructions; and determining, for each data access, the memory devices to be used when executing the application;

wherein the determining of information suitable for compiling an application to be executed comprises indicating that data accesses to different memory devices are free to be scheduled by the compiler at the same cycle.

* * * * *